United States Patent
Chu et al.

(10) Patent No.: US 10,147,453 B1
(45) Date of Patent: Dec. 4, 2018

(54) LASER BOOST AND DURATION OPTIMIZATION

(71) Applicant: Seagate Technology LLC, Cupertino, CA (US)

(72) Inventors: Alfredo Sam Chu, Prior Lake, MN (US); Franklin P Martens, Bloomington, MN (US); Aaron Jacobs, Belle Plaine, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/882,420

(22) Filed: Oct. 13, 2015

(51) Int. Cl.
*G11B 5/012* (2006.01)
*G11B 7/1267* (2012.01)
*G11B 5/00* (2006.01)
*G11B 5/455* (2006.01)

(52) U.S. Cl.
CPC ............ *G11B 7/1267* (2013.01); *G11B 5/012* (2013.01); *G11B 5/4555* (2013.01); *G11B 2005/0021* (2013.01)

(58) Field of Classification Search
None
See application file for complete search history.

(56) References Cited

U.S. PATENT DOCUMENTS

| | | |
|---|---|---|
| 5,978,335 A | 11/1999 | Clark et al. |
| 6,278,667 B1 | 8/2001 | Belser |
| 6,694,477 B1 | 2/2004 | Lee |
| 6,807,740 B2 | 10/2004 | Reed et al. |
| 7,106,678 B2 | 9/2006 | Yano et al. |
| 7,133,344 B2 | 11/2006 | Yano et al. |
| 7,215,496 B1 | 5/2007 | Kupferman et al. |
| 7,826,740 B2 | 11/2010 | Fediakine et al. |
| 7,872,822 B1 | 1/2011 | Rothberg |
| 7,952,830 B2 | 5/2011 | Lee et al. |
| 8,169,726 B2 | 5/2012 | Wilson |
| 8,786,972 B2 | 7/2014 | Grobis et al. |
| 8,824,085 B2 | 9/2014 | Wilson et al. |
| 8,842,507 B1 | 9/2014 | Hirano et al. |
| 8,873,353 B1 | 10/2014 | Riddering |

(Continued)

OTHER PUBLICATIONS

Bhargava, Lowering HAMR Near-Field Transducer Temperature via Inverse Electromagnetic Design, IEEE Transactions on Magnetics, vol. 51, No. 4, Apr. 2015, US, 7 pages.

*Primary Examiner* — Brian Butcher
(74) *Attorney, Agent, or Firm* — Cesari & Reed, LLP; Kirk A. Cesari

(57) ABSTRACT

This disclosure is related to systems, devices, processes, and methods to optimize a laser power boost amplitude, a laser power boost duration, or both in a heat-assisted data recording device, such as in heat-assisted magnetic recording (HAMR). The amplitude and duration for the laser power boost may be determined for a specific portion of a write operation, such as a first sector of the write operation. During operation of a data storage device, the laser power boost may provide additional power to the laser for the specific portion. Once the laser power boost duration has elapsed, the data storage device may continue providing power to the laser at the normal power input range of the laser. The laser power boost settings may be determined on a per head per zone basis, per track basis, or another configuration.

7 Claims, 7 Drawing Sheets

(56) References Cited

U.S. PATENT DOCUMENTS

| | | |
|---|---|---|
| 8,897,103 B2 | 11/2014 | Alex |
| 8,897,104 B1 | 11/2014 | Yan et al. |
| 8,929,186 B1 | 1/2015 | Sharma et al. |
| 8,976,633 B1 | 3/2015 | Ruan et al. |
| 2004/0202215 A1 | 10/2004 | Fairgrieve |
| 2007/0116132 A1 | 5/2007 | Fediakine et al. |
| 2011/0205861 A1* | 8/2011 | Erden ................. G11B 5/02 369/13.27 |
| 2013/0077453 A1* | 3/2013 | Alex ................... G11B 5/02 369/13.26 |

* cited by examiner

LASER BOOST AND DURATION OPTIMIZATION

SUMMARY

In certain embodiments, a method may include calibrating a laser-assisted data recording system by performing a first laser calibration at a first granularity, performing a first laser optimization to determine a first laser power boost setting and duration setting for a first sector of a write operation to a data storage medium, and enabling the laser-assisted data recording system to record data to the first sector based on the first laser power boost setting and the first duration setting.

In certain embodiments, an apparatus may include a controller configured to determine a first laser power boost setting to be applied during writing of data to a data storage medium, and initiate a laser-assisted data recording system to record data to the data storage medium utilizing the first laser power boost setting.

In certain embodiments, a device may include a write element configured to write data to a data storage medium and a laser configured to heat the data storage medium in relation to a write operation to the data storage medium. The device may also include a controller configured to perform a calibration process to determine a first laser power setting for a first portion of the write operation, the first laser power setting indicating an amount of power to be provided to a laser during a heat-assisted data recording process, and a memory to store the laser power setting.

DETAILED DESCRIPTION

In the following detailed description of the embodiments, reference is made to the accompanying drawings which form a part hereof, and in which are shown by way of illustrations. Features of the various described embodiments may be combined, exchanged, removed, other embodiments may be utilized, and structural changes may be made without departing from the scope of the present disclosure.

In accordance with various embodiments, the methods and functions described herein may be implemented as one or more software programs running on a computer processor or controller, or may be implemented as one or more functional settings programmed by a processor or controller. In accordance with various embodiments, the methods and functions described herein may be implemented as one or more software programs running on a computing device, such as a data storage device or data storage device test system. Dedicated hardware implementations including, but not limited to, application specific integrated circuits, programmable logic arrays, programmable register settings, and other hardware devices can likewise be constructed to implement the methods and functions described herein. Further, the methods and functions described herein may be implemented as a device, such as a computer readable storage medium or memory device, including instructions that when executed cause a processor to perform the methods.

Figure 1:
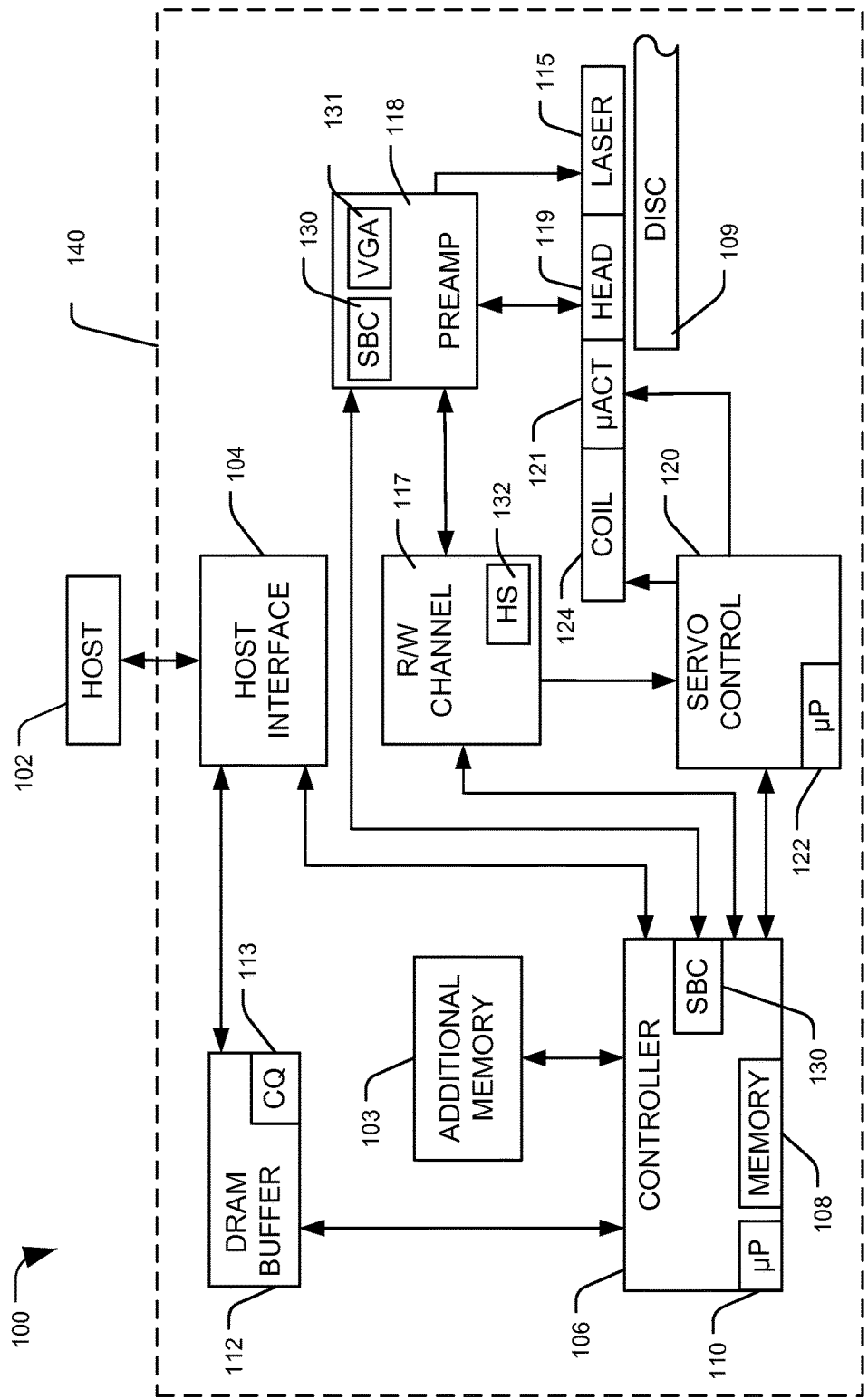
FIG. 1 is a diagram of a system for laser boost and duration optimization, in accordance with certain embodiments of the present disclosure.

Referring to FIG. 1, a diagram of a system for laser boost and duration optimization is shown and generally designated 100, in accordance with certain embodiments of the present disclosure. Specifically, FIG. 1 provides a functional block diagram of an example data storage device (DSD) 140 and host 102. The DSD 140 may be hard disc drive (HDD), a hybrid storage device, or other type of storage device.

The DSD 140 can include one or more data storage mediums, such as one or more disc(s) 109 or nonvolatile (NV) solid state memory 103, such as Flash memory. A DSD 140 containing multiple types of nonvolatile storage mediums, such as a disc(s) 109 and NV solid state memory 103, may be referred to as a hybrid storage device.

In some embodiments, the DSD 140 can communicate with a host device 102 via a hardware and firmware-based interface circuit 104. The interface 104 may comprise any interface that allows communication between a host 102 and a DSD 140, either wired or wireless, such as Universal Serial Bus (USB), IEEE 1394 (Institute of Electrical and Electronics Engineers standard 1394), Compact Flash, Serial AT Attachment (SATA), external SATA (eSATA), Parallel ATA (PATA), Small Computer System Interface (SCSI), Serial Attached SCSI (SAS), Peripheral Component Interconnect Express (PCIe), Fibre Channel, Ethernet, or Thunderbolt, among others. The interface 104 may include a connector (not shown) that allows the DSD 140 to be physically removed from the host 102. In some embodiments, the DSD 140 may have a casing or housing containing the components of the DSD 140, or the components of the DSD 140 may be attached to the housing, or a combination thereof.

The DSD 140 may include a buffer 112, which may be volatile or nonvolatile memory, and a command queue 113, where the buffer 112 can temporarily store data during read and write operations, and the command queue (CQ) 113 can temporarily store multiple operations pending execution. Commands arriving over the interface 104 may automatically be received in the CQ 113 or may be stored there by controller 106, interface 104, or another component.

The DSD 140 can include a programmable controller 106, which can include associated memory 108 and processor 110. In some embodiments, the DSD 140 can include a read-write (R/W) channel 117, which can encode data during write operations and reconstruct user data retrieved from a memory, such as disc(s) 109, during read operations. A preamplifier circuit (preamp) 118 can apply write currents to the head(s) 119 and provides pre-amplification of read-back signals to the R/W channel 117. A servo control circuit 120 may use servo data to provide an appropriate current to the coil 124, which may be a voice coil motor (VCM), to position the head(s) 119 over a desired area of the disc(s) 109. The controller 106 can communicate with a processor 122 to move the head(s) 119 to the desired locations on the disc(s) 109 during execution of various commands, such as from the command queue 113.

The preamp 118 may include a variable gain amplifier (VGA) 131 that can measure an amplitude of a read signal. Further, the channel 117 may include a harmonic sensor (HS) 132 which can also be used to measure an amplitude of a read signal.

The DSD 140 may also include a laser emitter 115 and a first sector boost and duration control (SBC) module 130. A "module" may be one or more physical components of a computing device (e.g., circuits) configured to perform a particular task or job, or it may be a firmware program or code that, when executed, causes a processor to perform the particular function, task, or job, or may be a combination thereof. The laser emitter 115 may be located on a rotating arm controlled by the coil 124 and proximate to or incorporated into the head(s) 119. The laser emitter 115 may include a near-field transducer (NFT) to apply nanoscale heating to a localized area of the disc(s) corresponding to a write operation, thereby changing the magnetic coercivity to facilitate the head(s) 119 in setting a magnetic field. Such is referred to as heat-assisted magnetic recording (HAMR).

The disc 109 may include multiple data storage surfaces, multiple discs, or any combination thereof. Each data storage surface can have multiple zones and can have a corresponding laser-assisted write element.

The SBC module 130 may control the power (e.g. amperage) applied to the laser 115 via the preamp 130, which can modify the strength of the laser. A stronger laser can heat a larger area of the disc(s) 109, which in turn can increase an area of influence or "write width" of a recording head. For example, a lower power laser may produce a narrow write, while a high power laser may produce a wide write. The SBC module 130 may adjust an amount of current provided to the laser emitter 115 based on control signals from, e.g., the controller 106 to the preamp 118. In some embodiments, the SBC module 130 may be located in or executed by the controller 106.

Further, the preamplifier 118 may include registers (e.g. programmable memory addresses) programmable by the controller 106 to set a power boost setting and to set a duration setting of the preamp 118. These registers can be selectively programmed to control the power provided to the laser 115 from the preamp 118. The power boost registers and the duration registers of the preamp 118 may be programmed via control lines from the controller 106, where the controller 106 can provide a high voltage (e.g. >3V) to signify a logic high in the respective register or a low voltage (e.g. <1V) to signify a logic low in the respective register.

A problem may arise when the laser 115 starts writing a first sector during a write operation, which can be caused by variances in an air bearing fly-height of the head 119 over the disc 109, which can lead to a higher than acceptable bit error rate (BER) in the first sector of the write operation. To correct this problem, the preamplifier 118 can implement a power boost to the laser 115 for a duration of a first sector of the write operation. This can provided a more reliable write during the first sector of a write operation.

However, physical and mechanical variances of the head 119 and the media 109 can lead to significant BER variances even when a first sector power boost is applied to the laser 115. To compensate for this, the SBC 130 may implement a variable power and duration for a first sector laser boost. The variable power and duration may be based on a specific head 109 and zone of the media 119 combination. Thus, the SBC 130 may customize settings based on specific head and media combinations, specific data storage areas, or any combination thereof.

To implement a variable first sector laser boost and duration, the controller 106 may determine a value to apply for the laser boost power from a table stored in non-volatile memory (e.g. additional memory 103 or disc 109). For example, the table may indicate a setting to program to a power boost register of the preamp 118 for a specific head and media combination. Further, the table may indicate a setting to program to a duration register of the preamp 118 for the specific head and media combination. In some embodiments, the table may include power boost and duration settings per zone for each head and disc combination. A zone may be an area of the disc 109 that has multiple tracks, where there are multiple zones on the disc 109.

Once power boost and duration settings are determined for a data storage device, the stored settings can be used during operation of the device to change an amount of power, e.g. provide a power boost, from a preamplifier to a laser, such as while writing data to a first sector of a write operation. The change to the amount of power can modify a size of a localized area of a corresponding surface the laser affects during the write operation. The power boost can lead to a lower BER for the first sector of a write operation.

Figure 2A:
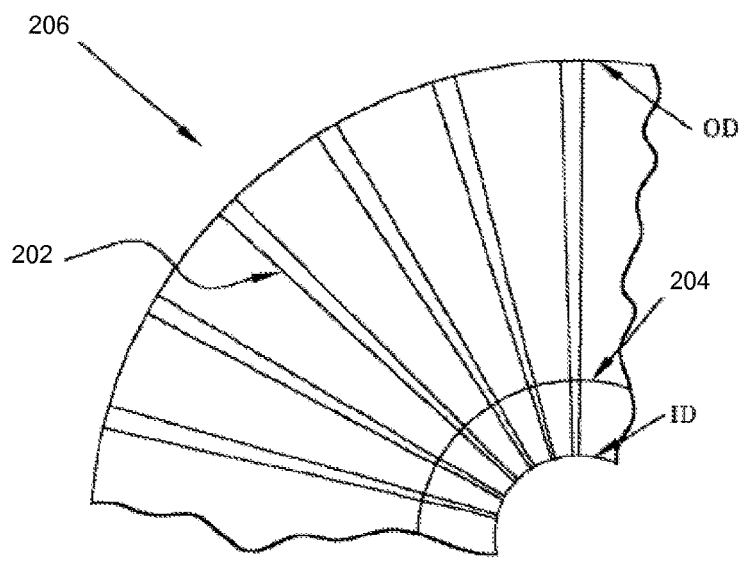
FIGS. 2A and 2B are diagrams of a system for laser boost and duration optimization, in accordance with certain embodiments of the present disclosure.
Figure 2B:
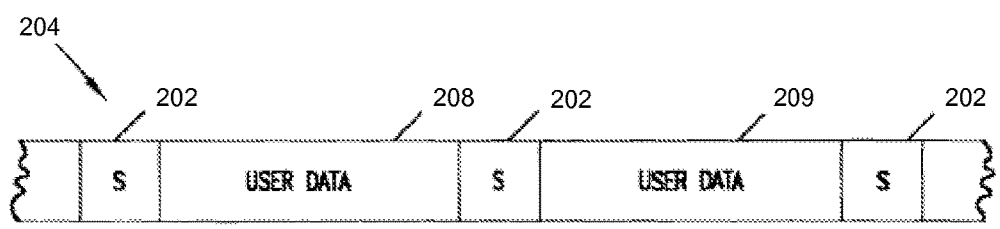

FIGS. 2A and 2B depict diagrams of a system for laser boost and duration optimization, in accordance with certain embodiments of the present disclosure. FIG. 2A depicts a portion of disc media 206, which may be the disc 109. Disc media 206 may include an inner diameter (ID) which can be adjacent to a spindle about which the disc media 206 can rotate during operation of a disc drive, and an outer diameter (OD) opposite the ID.

Disc 206 may include circular tracks 204 (only one representation is shown, however there are many) which can extend circumferentially around each disc. As used herein, a "track" or "data track" may refer to a data track on which a data storage drive can store data during write operations. Radially-oriented (e.g. extending like spokes from the ID to the OD) servo patterns 202 contain servo information, which may be used for head positioning and track following during drive operation. For example, the servo data in the servo patterns 202 may include information identifying a track, a servo sector, alignment patterns used to center a read/write head, other information, or any combination thereof. The servo data or servo information stored to the servo patterns 202 can be used by servo control systems to determine the boundaries and centerlines of each of the tracks 204. The servo data can be used to position the head over the tracks 204 of the disc 206, such as by seeking to a desired track or by following the desired track.

In some embodiments, the servo patterns 202 are not straight spokes. For example, the disc medium 206 may be subdivided into zones, with a zone comprising a plurality of concentric tracks 204. In some embodiments, different zones may have a different number of servo patterns 202, may have servo patterns 202 at different radial spacing on the disc medium 204, may have servo patterns 202 of different sizes, or other variations. The servo patterns 202 may be written to a disc 206 prior to installation into a drive or may be written after the disc has been installed into a drive.

Each track 204 may include a plurality of servo sectors or sector marks where the track 204 intersects with the servo patterns 202. Each of the servo sectors 202 can contain servo information or servo data that is stored in various servo fields. The servo information can be used to identify the location of data tracks 204. In some embodiments, the servo data may define the position of "servo tracks", for example by a track number or track ID. A circular servo track can include a circular string of sector marks, and may roughly correspond to data tracks 204. Tracks 204 may be sequentially numbered in accordance with their radial position on the disc 206. For example, for a set of "N" tracks, track 1 may be located adjacent to an outer diameter (OD) of disc 206 and track N may be located adjacent to an inner diameter (ID) of disc 206.

An example of a portion of a track 204, such as shown in FIG. 2B, may include servo sectors 202 interspersed between data sectors 208, in which data such as user data, system data, or other data can be stored. Servo sectors 202 can provide coarse positioning information (such as a track ID information used to locate a desired track), as well as fine positioning information to indicate a position of a head relative to a center line of a given data track 204. For example, burst patterns or null-type servo patterns can be used for fine positioning.

As a disc 206 spins under a head, the drive may direct the head to read servo data at selected intervals (e.g. based on nanoseconds when a disc is spinning at a known rotation speed). The drive may use the read servo data (e.g. using a servo control system) to determine whether the head is centered over a desired track 204, and to perform any necessary positional adjustments. When the drive determines that the head is located over the desired track 204, the head may be used to read data from or record data to the data sectors 208.

During operation of the disc 206, a write operation to one or more data sectors may require a laser heating element to power on and reach an optimal heating profile. The heating element may have a reduced or non-optimal heating profile when applying heat during writing of the first sector, such as sector 208, thus the NFT may not affect the area of the first sector to a desired degree leading to a lower quality write data stored in sector. After the heating element has warmed up and reached an optimal heating profile, writing of data to a sector, such as sector 209, may result in an expected or normal quality write data stored in sector 209. Applying a laser boost for a specified duration can help provide a higher quality (i.e. higher signal to noise ratio (SNR)) write data during the time the laser needs to reach the optimal heating profile. This can lead to a much lower BER for the data sector(s) of the duration than without the laser boost. For example, the systems and methods described herein may apply a selected laser boost and duration during writing of a first data sector, such as sector 208, and not apply the selected laser boost during writing of a second, adjacent data sector, such as sector 209.

Figure 3:
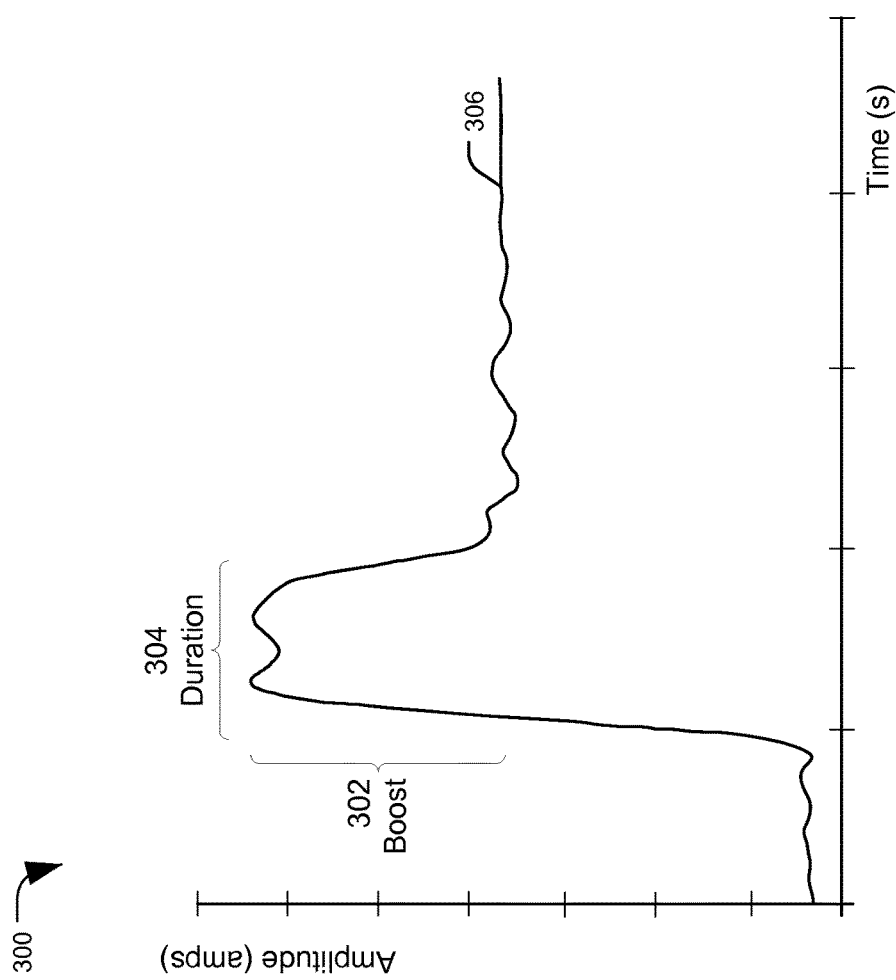
FIG. 3 is a chart of a system implementing a laser boost and duration optimization, in accordance with certain embodiments of the present disclosure.

Referring to FIG. 3, a chart of a signal implementing a laser boost and duration optimization generally designated 300, in accordance with certain embodiments of the present disclosure. The signal 300 shows an amplitude and duration of an amperage applied to a laser, such as applied to laser 115 from the preamplifier 118. The signal 300 can include a boost amplitude 302 and a boost duration 304, which may be dynamically modified and determined as discussed herein. After the boost duration 304, the signal 300 may converge to an optimal amplitude 306 corresponding to an optimal heating profile of the laser. For example, the boost 302 may be applied during the duration 304, which may correspond to a first sector of a write operation, to result in a higher SNR and lower BER for the duration 304. The duration 304 may be for all of a single sector, a portion less than all of a single sector, or more than a single sector.

Figure 4:
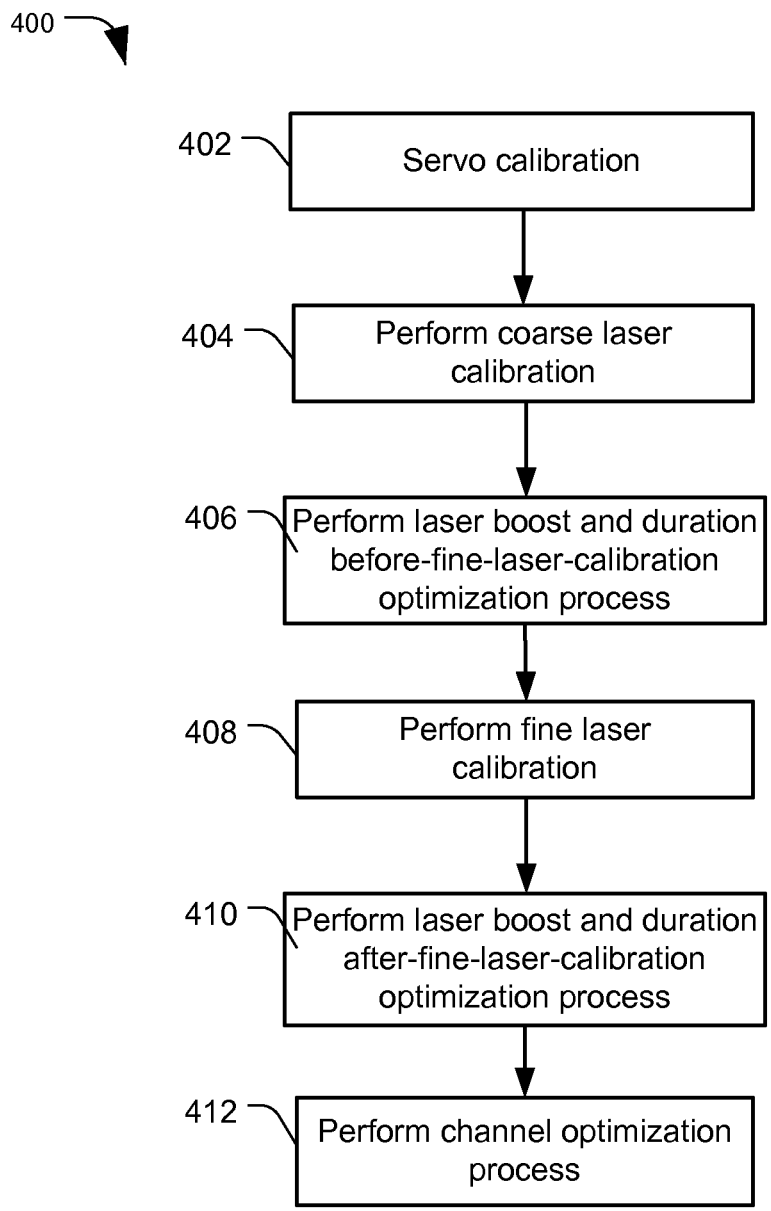
FIG. 4 is a flowchart of a process for laser boost and duration optimization, in accordance with certain embodiments of the present disclosure.

Referring to FIG. 4, a flowchart of a process for laser boost and duration optimization is shown and generally designated 400, in accordance with certain embodiments of the present disclosure. The process 400 may be implemented by a disc calibration device, such as disc drive 140 or a spin-stand or during a factory manufacturing process.

The process 400 may be initiated with a servo calibration, at 402. The servo calibration may calibrate a servo positioning system for improved track following or may write servo information to a corresponding disc. The process may also include performing a coarse laser calibration, at 404, to determine an initial amount of power to be provided to the laser.

Figure 6:
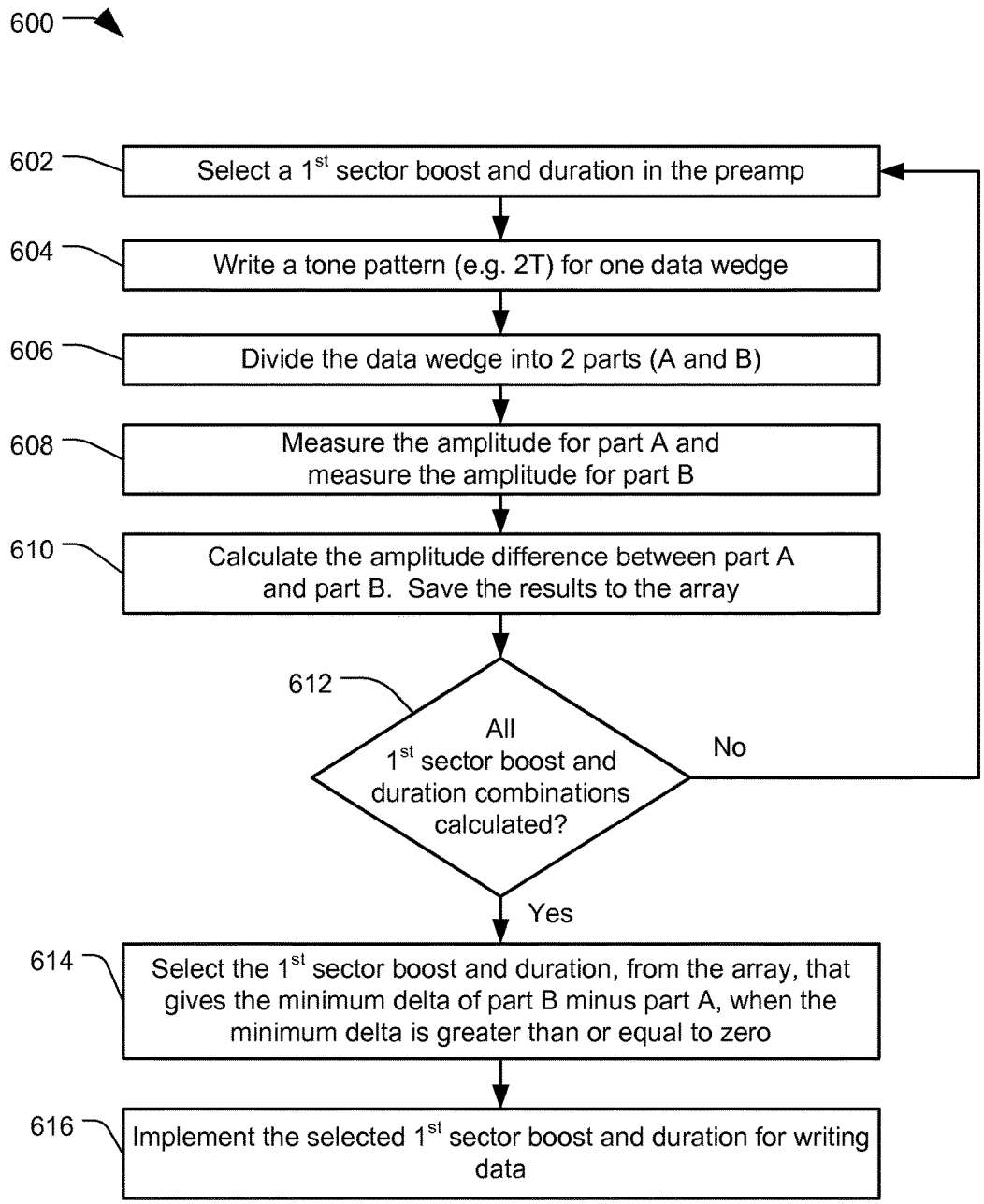
FIG. 6 is a flowchart of a process for laser boost and duration optimization, in accordance with certain embodiments of the present disclosure.

The process 400 may also include performing a first laser boost and duration calibration optimization process, at 406, such as discussed with respect to FIG. 6, before a fine laser calibration occurs, at 408. The first laser boost and duration calibration can determine a selected amplitude for a laser boost, the duration of the boost, or both. For example, this can be accomplished by iteratively testing each boost and duration combination setting of a preamplifier, determining a change in amplitude of a written signal for each iteration, and then selecting the setting that produced the minimum change in amplitude.

The fine laser calibration can then occur, at 408. The fine laser calibration can include adjusting the power applied to the laser from the preamplifier based on metrics of a readback signal. The process 400 may then perform a second laser boost and duration calibration optimization process, at 410, such as discussed with respect to FIG. 7. The second laser boost and duration calibration can determine a selected amplitude for a laser boost, the duration of the boost, or both to be updated after the fine laser calibration. For example, this can be accomplished by iteratively testing each boost and duration combination setting of a preamplifier, determining a change in BER for a sector for each iteration, and then selecting the setting that produced the minimum change in BER.

Once the laser boost and duration settings for the preamplifier are identified, the process 400 may proceed to performing other processes, such as a channel optimization process, at 412. The process 400 may be repeated for as many data storage zones, areas, or tracks for which a custom laser power boost setting is desired.

Figure 5:
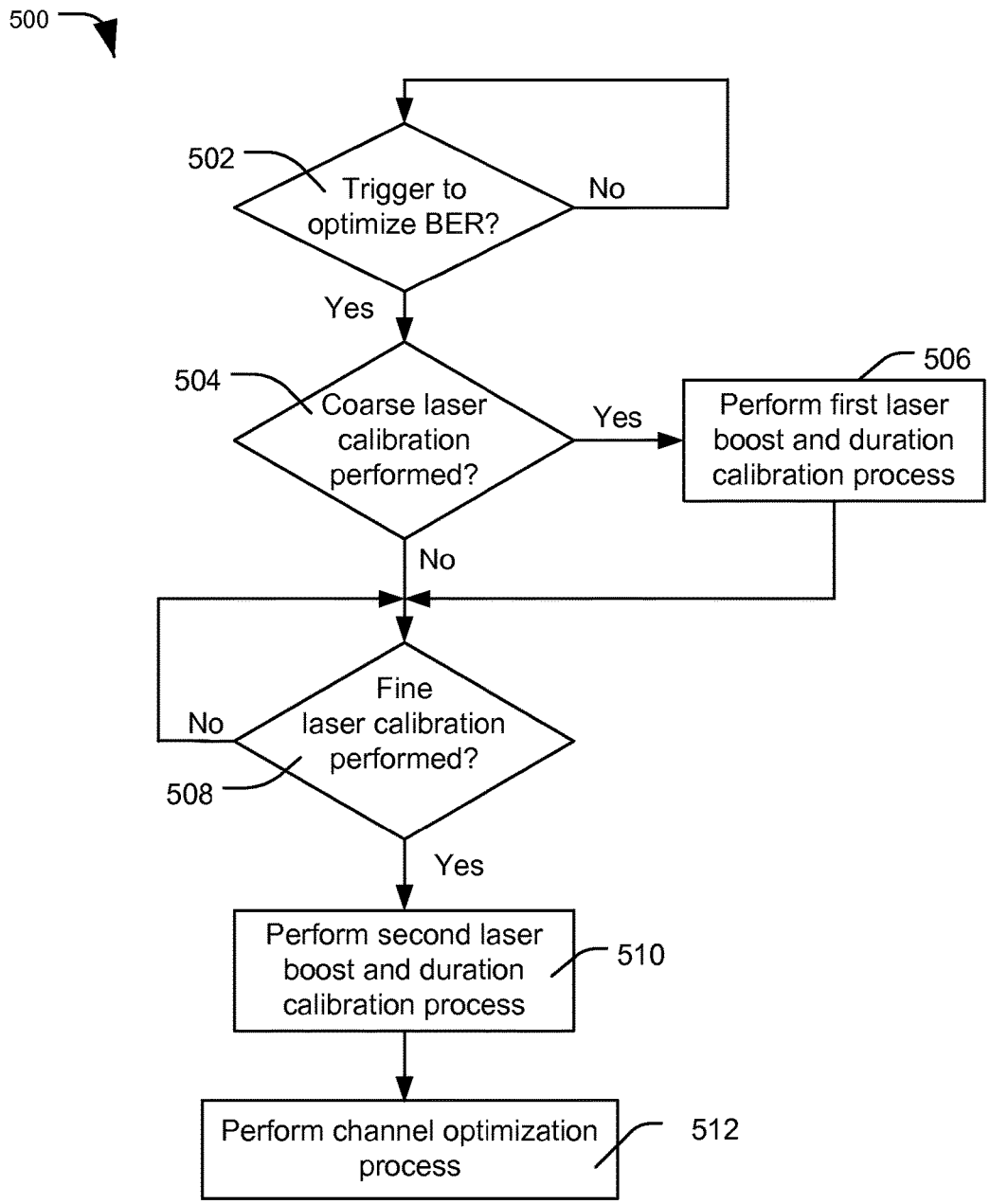
FIG. 5 is a flowchart of a process for laser boost and duration optimization, in accordance with certain embodiments of the present disclosure.

Referring to FIG. 5, a flowchart of a process for laser boost and duration optimization is shown and generally designated 500, in accordance with certain embodiments of the present disclosure. The process 500 is an example of steps that may be utilized by a data storage device during operation of the data storage device. For example, the process 500 may be performed by the controller 106.

The process 500 may be initiated when a trigger is indicated or received, at 502. The trigger may be a detection of a BER by the channel 117 that is above a threshold. Or the trigger may be the controller 106, the channel 117, or the laser 115 initiating a laser calibration. Further, the trigger could be any other condition which may affect a sector laser boost setting, such as a disc formatting operation or a servo calibration.

In some examples, once a trigger is detected or received, the process 500 may determine if a coarse laser calibration has occurred, at 504. If such has occurred, the process may then perform a first laser boost and duration calibration process, at 506, such as discussed with respect to FIG. 6. When a coarse laser calibration has not occurred or when the first laser boost and duration calibration process is finished, the process 500 may determine whether a fine laser calibration has been performed, at 508.

Figure 7:
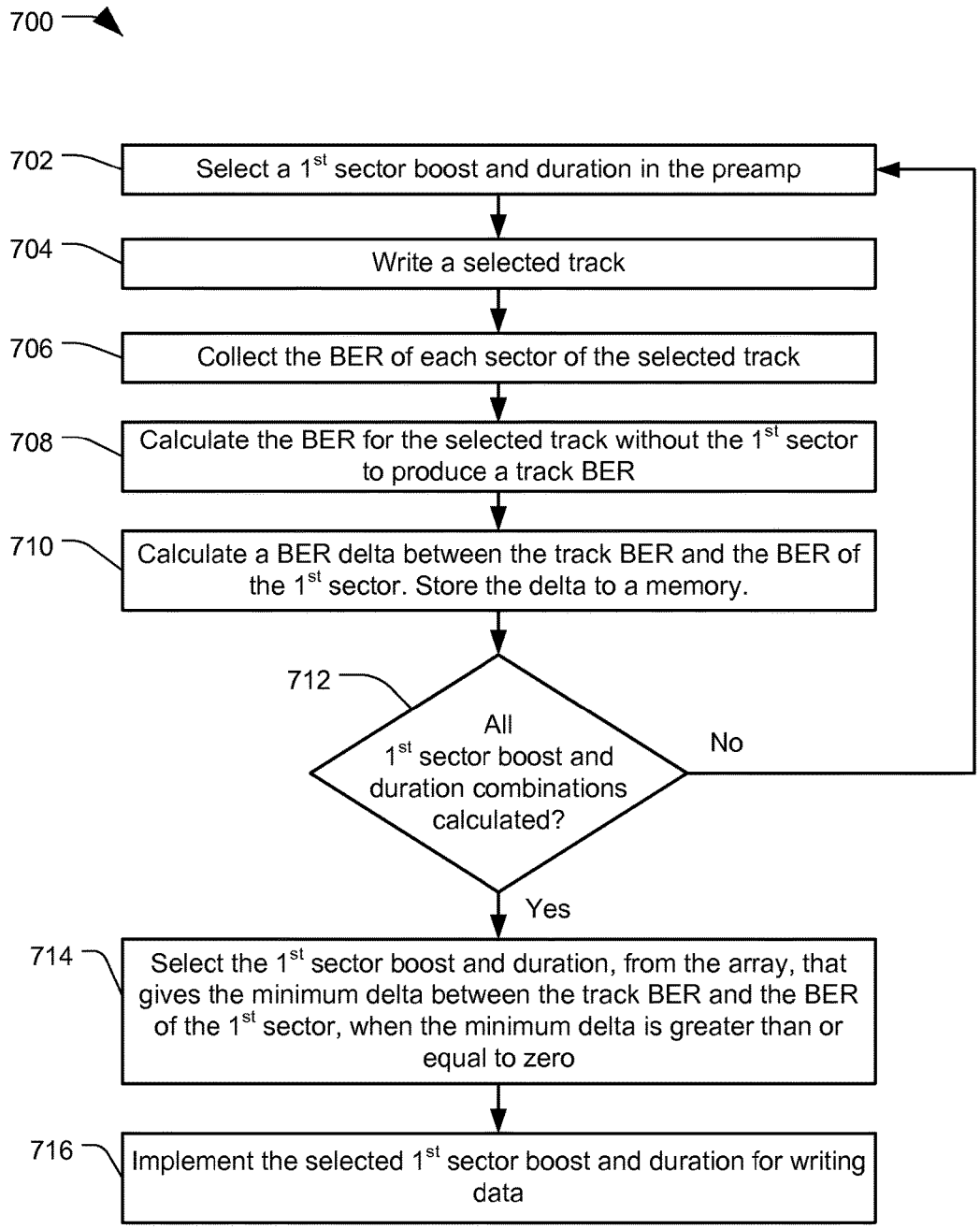
FIG. 7 is a flowchart of a process for laser boost and duration optimization, in accordance with certain embodiments of the present disclosure.

When the fine laser calibration has been completed, the process 500 may include performing a second laser boost and duration calibration process, at 510, such as discussed with respect to FIG. 7. When the second laser boost and duration calibration process is complete, the process 500 may perform other operations or processes, such as performing a channel optimization process that can determine settings of the channel to optimize data recovery, at 512. After the second laser boost and duration calibration process is complete or after the channel optimization process is complete, the data storage device may resume normal data operations (e.g. performing read and write operations for a host computer). Further, the process 500 may be repeated based on receiving or detecting another trigger, at 502.

However, when a fine laser calibration has not been performed, at 508, the process 500 may wait for a fine laser calibration to be performed or completed, such as shown at 508. In some embodiments, the process 500 may include performing the second laser boost and duration calibration, at 510, whether or not a fine laser calibration has been performed. Further, the process 500 may end if a fine laser calibration is not performed, and normal operations of the data storage device can resume while utilizing the updated power boost settings.

Referring to FIG. 6, a flowchart of a process for laser boost and duration optimization is shown and generally designated 600, in accordance with certain embodiments of the present disclosure. The process 600 is an example of steps that may be utilized by a manufacturing process, such as at a spin-stand or during device certification, or may be utilized by a data storage device during operation of the data storage device. For example, the process 600 may be performed by the controller 106 or a spin-stand, which can include a controller, channel electronics, preamp, and memory that allow reading from and writing to one or more discs. In some embodiments, the process 600 may be performed after a coarse laser calibration but before a fine laser calibration. The coarse laser calibration can include adjusting the power applied to the laser from the preamplifier based on metrics of an initial readback signal. The fine laser calibration can include adjusting the power applied to the laser based on metrics of a subsequent readback signal.

The process 600 may be utilized to determine a laser power boost setting and duration. The process 600 can include selecting a specific laser power boost setting of multiple laser power boost settings that provides power to a laser for heat-assisted data recording, at 602, such as in HAMR device. The laser power boost settings can be varied by a controller programming selected registers of a preamplifier that control an amplitude of a laser power signal, a duration of the laser power signal, or both.

Once a setting combination is selected, the process 600 can write a tone pattern for a selected data wedge of a data storage medium, at 604. The tone pattern may be a 2T tone. A 2T tone is a short wavelength data pattern written to the data storage medium having a length equal to two data bits. For example, an 8T tone would be a long wavelength data signal produced by a data pattern having data transitions that are 8 data bits apart.

After the tone pattern is written, the process 600 may divide the selected data wedge into two portions, which may be equal in size, at 606. The process 600 may then read the tone pattern and determine a first amplitude of a first read signal of the tone pattern for a first part of the selected data wedge, at 608. The process 600 may also determine a second amplitude of the tone pattern corresponding to the second part of the selected data wedge, at 608. The second amplitude may be determined via a second read signal or by splitting the first read signal into portions corresponding to the data wedge portions. The amplitudes may be determined by a VGA, such as the VGA 131, or a harmonic sensor, such as harmonic sensor 132. The process 600 may then determine a difference between the first amplitude and the second amplitude, at 610, and store the difference in a memory, at 610.

The process 600 can determine if all combinations of power and durations settings have been tested, at 612. When all the combinations of settings have not been tested, the process 600 may repeat steps 602 through 610 until each laser power boost setting and duration setting combination has a corresponding difference calculated and saved. However, in some embodiments, the process 600 may not require all combinations to be calculated, instead calculating only some of the combinations to do a comparison, or calculating only one new combination's difference and comparing it to a previously implemented combination's difference.

When the laser power boost setting and duration setting combinations have a corresponding difference calculated and saved, the process 600 may determine which laser power boost setting and duration setting combination results in a smallest difference, at 614. However, the process 600 may exclude any difference that results in a negative number since the second part of the data wedge should have a higher amplitude than the first part of the data wedge. If the second part of the data wedge does not have a higher amplitude than the first part of the data wedge, other problems with the data recording system may exist. The process 600 can then store the selected laser power boost setting and a selected duration setting that correspond to the smallest difference to a memory, at 616.

The process 600 may be repeated for each head and zone combination of a data storage medium, for each track of a data storage medium, for each sector of a data storage medium, for each band of tracks of a data storage device, for another amount of data storage, or any combination thereof. In some instances, the process 600 may be performed and the results compared to a previously saved setting, where the new setting is only used if it provides a better result (e.g. having a smaller delta) than the previously saved setting.

Once the combination of settings are stored to the memory, the settings may be later used by a data storage controller during a write operation to provide a power boost to the laser for a specific duration. For example, the laser power boost may be applied during a first sector, or first portion less than all of a sector, of the write operation where the remaining sectors of the write operation may be performed with a normal, non-boosted laser power.

Referring to FIG. 7, a flowchart of a process for laser boost and duration optimization is shown and generally designated 700, in accordance with certain embodiments of the present disclosure. The process 700 is an example of steps that may be utilized by a manufacturing process, such as at a spin-stand or during device certification, or may be utilized by a data storage device during operation of the data storage device. For example, the process 700 may be performed by the controller 106 or a spin-stand, which can include a controller, channel electronics, preamp, and memory that allow reading from and writing to one or more discs. In some embodiments, the process 700 may be performed after a fine laser calibration. The fine laser calibration can include adjusting the power applied to the laser based on metrics of a readback signal to adjust and determine a normal operating power for the laser.

The process 700 may be utilized to determine a laser power boost setting and duration. The process 700 can include selecting a specific laser power boost setting of multiple laser power boost settings that provides power to a laser for heat-assisted data recording, at 702, such as in HAMR device. The laser power boost settings can be varied by a controller programming selected registers of a preamplifier that control an amplitude of a laser power signal, a duration of the laser power signal, or both.

Once a setting combination is selected, the process 700 can write a selected data track, at 704. After the track is written, the process 700 can determine a bit error rate (BER) of each sector of the selected track, at 706. The process may then calculate an average BER for the selected track, with the BER corresponding to the first written sector of the track excluded from the average calculation, at 708. However, the BER of every sector is not required, only enough BER readings of the track to determine a representative BER for the track, without the BER of the first written sector, are necessary. The process 700 may then determine a difference between the BER of the first written sector of the track and the average or representative BER of the track, at 710, and store the difference in a memory, at 710. If a track has a defect, or too many defects, it may be excluded from the testing and another track may be selected for the testing.

The process 700 can determine if all combinations of power and durations settings have been tested, at 712. When all the combinations of settings have not been tested, the process 700 may repeat steps 702 through 710 until all laser power boost setting and duration setting combinations have a corresponding difference calculated and saved. However, in some embodiments, the process 700 may not require all combinations to be calculated, instead calculating only some of the combinations to do a comparison, or calculating only one new combination's difference and comparing it to a previously implemented combination's difference. For example, process 700 (or any of the other processes described herein) may be implemented to iteratively calculate a difference and compare it to a threshold, where the first combination that produces a difference below the threshold can be implemented, then the remaining iterations of combinations may not need to be calculated.

When the laser power boost setting and duration setting combinations have a corresponding difference calculated and saved, the process 700 may determine which laser power boost setting and duration setting combination results in a smallest difference, at 714. However, the process 700 may exclude any difference that results in a negative number since the BER of the first sector should be higher than the average or representative BER of the rest of the track. Further, the process 700 may revert the settings back to a previous boost setting if the minimum delta is not an improvement over the previous boost setting.

The process 700 can then store the selected laser power boost setting and the selected duration setting that correspond to the smallest difference to a memory, at 716. In some instances, the process 700 may be performed and the results compared to a previously saved setting, where the new setting is only used if it provides a better result (e.g. having a smaller delta) than the previously saved setting. For example, a newly determined setting may provide the same calculated difference as a previous setting, or the settings are the same and do not need to be modified. In other examples, the newly determined setting may provide a smaller calculated difference than a previous setting and the new setting may be different than the previous setting.

Once the combination of settings are stored to the memory (e.g. determined by any of the processes described herein and stored in a table in a non-volatile memory within the data storage device), the settings may be retrieved from the memory and used by a data storage controller during a write operation to provide a power boost to the laser for a specific duration. For example, the laser power boost may be applied during a first sector, or first portion less than all of a sector, of the write operation where the remaining sectors of the write operation may be performed with a normal, non-boosted laser power.

The processes and functions described herein are not limited to factory calibration and can be employed in the field during customer testing or use. Further, the illustrations, examples, and embodiments described herein are intended to provide a general understanding of the structure of various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, any subsequent arrangement designed to achieve the same or similar purpose may be substituted for the specific embodiments shown.

This disclosure is intended to cover any and all subsequent adaptations or variations of various embodiments. Combinations of the above examples, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. A method comprising:
    calibrating a laser-assisted data recording system by:
        performing a first laser calibration at a first granularity;
        performing a first laser optimization to determine a first laser power boost setting for a first sector of a write operation to a data storage medium;
    writing a first sector of a first write operation while the laser-assisted data recording system applies a first laser power based on the first laser power boost setting;
    writing one or more second sectors of the first write operation while the laser-assisted data recording system implements a second laser power less than an amplitude of the first laser power;
    calibrating the laser-assisted data recording system by:
        performing a second laser calibration at a second granularity, the second granularity finer than the first granularity;
        performing a second laser optimization to determine a second laser power boost setting for the first sector; and
    enabling the laser-assisted data recording system to record data to the first sector based on the second laser power boost setting; and
    storing the second laser power boost setting to a lookup table in a memory of a data storage device associated with the laser-assisted data recording system when the second laser power boost setting results in a smaller change in amplitude of a written signal than the first laser power boost setting provides.

2. The method of claim 1 further comprising performing calibrating the laser-assisted data recording system and enabling the laser-assisted data recording system to record data during a data storage device manufacturing process.

3. The method of claim 1 further comprising performing the first laser optimization to determine the first laser power boost setting by:
  selecting a specific laser power boost setting of multiple laser power boost settings of a preamp that provides power to a laser;
  selecting a specific duration setting of multiple duration settings of the preamp;
  writing a tone pattern for a selected data wedge of a data storage medium;
  determining a first amplitude of a first read signal of the tone pattern for a first part of the selected data wedge;
  determining a second amplitude of a second read signal of the tone pattern for a second part of the selected data wedge;
  determining a difference between the first amplitude and the second amplitude;
  storing the difference in a memory;
  repeating the above steps until all laser power boost setting and duration setting combinations have a corresponding difference calculated and saved;
  determining which laser power boost setting and duration setting combination results in a smallest difference; and
  storing a selected laser power boost setting and a selected duration setting that correspond to the smallest difference to a memory as the first laser power boost setting and a first duration setting.

4. The method of claim 3 further comprising performing the second laser optimization to determine the second laser power boost setting by:
  selecting a specific laser power boost setting of multiple laser power boost settings of a preamp that provides power to a laser;
  selecting a specific duration setting of multiple duration settings of the preamp;
  writing a selected track of the data storage medium;
  determining a bit error rate (BER) of each sector of the selected track;
  determining an average BER of the selected track without a first sector that was written;
  determining a difference between the selected track's BER and the average BER;
  storing the difference in a memory;
  repeating the above steps until all laser power boost setting and duration setting combinations have a corresponding difference calculated and saved;
  determining which laser power boost setting and duration setting combination results in a smallest difference; and
  storing a selected laser power boost setting and a selected duration setting that correspond to the smallest difference to a memory as the second laser power boost setting and a second duration setting.

5. A device comprising:
  a write element configured to write data to a data storage medium;
  a laser configured to heat the data storage medium in relation to the write element;
  a controller configured to:
    write data to a first portion of a first write operation while a first laser power is applied to the laser based on a first laser power setting;
    write data to a second portion of the first write operation while a second laser power is applied to the laser, the second laser power less than the first laser power;
  a preamplifier coupled to the controller, the preamplifier configured to provide an amplified write signal to the write element and provide a power signal to the laser; and
    the preamplifier including multiple registers programmable by the controller to vary an amplitude of the power signal and a duration of the power signal.

6. The device of claim 5, wherein the device comprises one of a spin-stand and a removable data storage device.

7. The device of claim 5 further comprising:
  the controller configured to perform a calibration process to determine the first laser power setting, the calibration process includes:
    determining a first duration the first laser power is to be applied to the data storage medium;
    storing the first duration to a memory;
  the controller is further configured to:
    retrieve the first duration and the first laser power setting from the memory when the write element is about to write to a specific sector of the data storage medium;
    selectively program a first specific combination of the multiple registers to set a selected amplitude and a selected duration of the power signal to implement the first laser power setting and the first duration; and
    selectively program a second specific combination of the multiple registers to set a lower amplitude of the power signal than the selected amplitude to implement a lower amplitude power signal after the first duration.

* * * * *